(12) United States Patent
Kato (10) Patent No.: US 11,965,310 B2
(45) Date of Patent: Apr. 23, 2024

(54) CAB AND WORK VEHICLE (71) Applicant: KOMATSU LTD., Tokyo (JP)

(72) Inventor: Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 151 days.

(21) Appl. No.: 17/629,820

(22) PCT Filed: Sep. 8, 2020

(86) PCT No.: PCT/JP2020/033898
§ 371 (c)(1),
(2) Date: Jan. 25, 2022

(87) PCT Pub. No.: WO2021/065375
PCT Pub. Date: Apr. 8, 2021

(65) Prior Publication Data
US 2022/0259820 A1 Aug. 18, 2022

(30) Foreign Application Priority Data
Sep. 30, 2019 (JP) ................................. 2019-179013

(51) Int. Cl.
E02F 9/16 (2006.01)
(52) U.S. Cl.
CPC ................... E02F 9/166 (2013.01)
(58) Field of Classification Search
CPC ....... B60N 2/753; B60N 2/767; E02F 9/1366; E02F 9/2004
See application file for complete search history.

(56) References Cited

U.S. PATENT DOCUMENTS

| 6,164,285 A | 12/2000 | Garberg et al. |
| 2004/0154427 A1 | 8/2004 | Jo et al. |
| 2005/0247152 A1 | 11/2005 | Jo et al. |
| 2006/0000656 A1 | 1/2006 | Bisick et al. |
| 2006/0042857 A1 | 3/2006 | Catton et al. |
| 2006/0202541 A1 | 9/2006 | Armo et al. |
| 2007/0144133 A1 | 6/2007 | Drake et al. |
| 2007/0145805 A1* | 6/2007 | Bower .................... E02F 9/166 296/190.01 |
| 2008/0066988 A1 | 3/2008 | Asp et al. |

(Continued)

FOREIGN PATENT DOCUMENTS

| CN | 1521040 A | 8/2004 |
| CN | 105329117 A | 2/2016 |

(Continued)

Primary Examiner — James A English
(74) Attorney, Agent, or Firm — Faegre Drinker Biddle & Reath LLP (57) ABSTRACT A cab includes: a console provided on a lateral side of an operator's seat; a base member including a support portion that pivotably supports the console between a normal posture in which the console is disposed to extend forward from the support portion and a tipped-up posture in which the console is disposed to extend upward from the support portion; and a tilt mechanism including a striker that is engaged with the console set in the normal posture and disengaged from the console set in the tipped-up posture, the tilt mechanism being capable of adjusting an angle of the console set in the normal posture.

6 Claims, 10 Drawing Sheets (56) References Cited

U.S. PATENT DOCUMENTS

| | | | |
|---|---|---|---|
| 2009/0012679 A1* | 1/2009 | Prasetiawan | E02F 9/166 |
| | | | 701/1 |
| 2009/0085392 A1 | 4/2009 | Lucas et al. | |
| 2013/0193729 A1* | 8/2013 | VanMiddendorp | B60N 2/24 |
| | | | 297/311 |
| 2015/0360593 A1 | 12/2015 | Mahler et al. | |
| 2018/0112374 A1 | 4/2018 | Kato | |
| 2018/0282971 A1* | 10/2018 | Yuan | G05G 5/005 |
| 2018/0347148 A1 | 12/2018 | Isaka et al. | |

FOREIGN PATENT DOCUMENTS

| | | |
|---|---|---|
| CN | 107075834 A | 8/2017 |
| JP | H07-090881 A | 4/1995 |
| JP | H09-291564 A | 11/1997 |
| JP | H10-252100 A | 9/1998 |
| JP | 2000-328604 A | 11/2000 |
| JP | 2003-090063 A | 3/2003 |
| JP | 2004-245025 A | 9/2004 |
| JP | 2006-528528 A | 12/2006 |
| JP | 2008-063889 A | 3/2008 |
| JP | 2008-063891 A | 3/2008 |
| JP | 2014-133556 A | 7/2014 |
| JP | 2017-115497 A | 6/2017 |

* cited by examiner

CAB AND WORK VEHICLE

TECHNICAL FIELD

The present disclosure relates to a cab and a work vehicle.

BACKGROUND ART

For example, Japanese Patent Laying-Open No. 10-252100 (PTL 1) discloses a wheel loader equipped with an operator's cab. The wheel loader includes: a tip-up mechanism for changing a console integrated with an armrest from a posture in which the console is disposed on the lateral side of an operator sitting on an operator's seat (a normal posture) to a posture in which the console is tipped up with respect to the operator's seat (a tipped-up posture); and a tilt mechanism for adjusting the angle of the console set in the normal posture.

CITATION LIST

Patent Literature

PTL 1: Japanese Patent Laying-Open No. 10-252100

SUMMARY OF INVENTION

Technical Problem

In the wheel loader disclosed in above-mentioned PTL 1, depending on the relation between the tip-up mechanism and the tilt mechanism, the inclination of the console set in the tipped-up posture may vary according to the angle adjustment of the console by the tilt mechanism. In such a case, due to interference among the console set in the tipped-up posture, a backrest of the operator's seat and the like, the operation of the console may be restricted, or a part of the armrest set in the tipped-up posture may overlap with the line of movement of the operator who gets in and out of the operator's seat.

Further, the wheel loader disclosed in PTL 1 is not provided with means for restraining the console set in the normal posture. In this case, vibrations occurring during the operation of the wheel loader may cause positional deviation of the console set in the normal posture.

Thus, an object of the present disclosure is to provide: a cab that allows a console set in a tipped-up posture to be tilted at a constant inclination and that is less likely to cause positional deviation of the console set in a normal posture; and a work vehicle including the cab.

Solution to Problem

A cab according to the present disclosure includes a console, a base member, and a tilt mechanism. The console is provided on a lateral side of an operator's seat. The base member includes a support portion that pivotably supports the console between a first posture and a second posture. In the first posture, the console is disposed to extend forward from the support portion. In the second posture, the console is disposed to extend upward from the support portion. The tilt mechanism includes an engagement portion The engagement portion is engaged with the console set in the first posture and disengaged from the console set in the second posture. The tilt mechanism is capable of adjusting an angle of the console set in the first posture.

A work vehicle according to the present disclosure includes the above-described cab.

Advantageous Effects of Invention

The present disclosure can provide: a cab that allows a console set in a tipped-up posture to be tilted at a constant inclination and that is less likely to cause positional deviation of the console set in a normal posture; and a work vehicle including the cab.

DESCRIPTION OF EMBODIMENTS

Embodiments of the present disclosure will be described with reference to the accompanying drawings. In the drawings referred to below, the same or corresponding members are denoted by the same reference characters.

Figure 1:
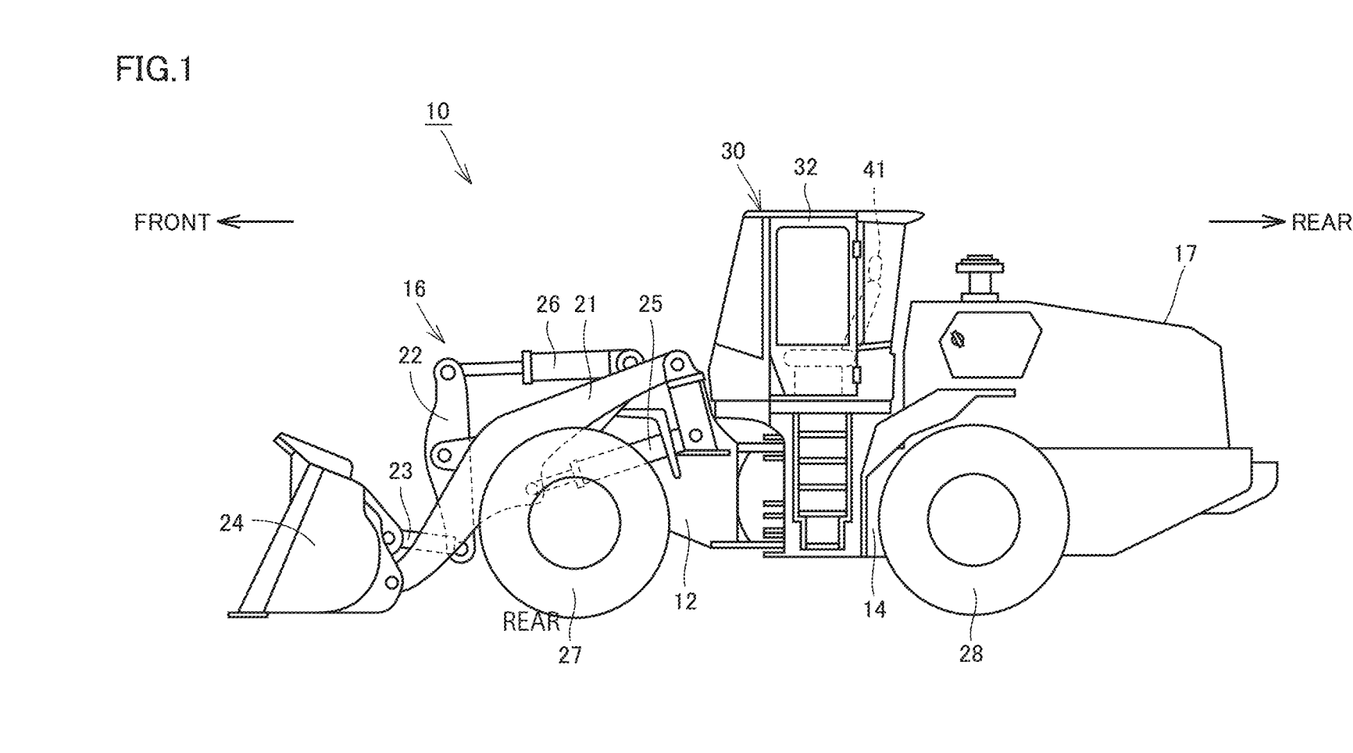
FIG. 1 is a side view showing a wheel loader.

FIG. 1 is a side view showing a wheel loader. The following first describes the entire structure of a wheel loader 10.

As shown in FIG. 1, wheel loader 10 includes a front frame 12, a rear frame 14, a front wheel 27, a rear wheel 28, a work implement 16, a cab (an operator's cab) 30, and an engine hood 17. Cab 30 includes an operator's seat 41.

In the following description, the front-rear direction corresponds to the front-rear direction of an operator sitting on operator's seat 41 inside cab 30. The direction in which the operator sitting on operator's seat 41 faces corresponds to the front direction. The direction rearward of the operator sitting on operator's seat 41 corresponds to the rear direction. The rightward-leftward direction (the lateral side) corresponds to the rightward-leftward direction of the operator sitting on operator's seat 41. In the state where the operator sitting on operator's seat 41 faces forward, the right side and the left side correspond to the right direction and the left direction, respectively. The upward-downward direction corresponds to a direction orthogonal to planes extending in the front-rear direction and the rightward-leftward direction. The ground side is defined as a lower side and the sky side is defined as an upper side.

Front frame 12 and rear frame 14 constitute a vehicular body frame having an articulated structure. Front frame 12 is provided forward of rear frame 14. Front frame 12 is pivotably connected to rear frame 14 by a center pin (not shown). The center of pivot of front frame 12 with respect to rear frame 14 corresponds to an axis extending in the upward-downward direction.

Front frame 12 and rear frame 14 are coupled by a steering cylinder (not shown) that is provided on each of the right and left sides as one pair of steering cylinders. As the steering cylinders are driven to extend and contract, front frame 12 pivots in the rightward-leftward direction about the above-mentioned center pin.

Front wheel 27 and rear wheel 28 are running wheels of wheel loader 10. Front wheel 27 is provided in front frame 12 and provided on each of the right and left sides as one pair of front wheels 27. Rear wheel 28 is provided in rear frame 14 and provided on each of the right and left sides as one pair of rear wheels 28.

Work implement 16 is provided in front frame 12. Work implement 16 includes a boom 21, a bucket 24, a boom cylinder 25, a bell crank 22, a bucket cylinder 26, and a link 23.

Cab 30 and engine hood 17 are provided in rear frame 14. Cab 30 is provided rearward of work implement 16. Engine hood 17 is provided rearward of cab 30. A hydraulic oil tank, an engine, a hydraulic pump, an air cleaner, and the like are accommodated in engine hood 17.

Cab 30 defines an interior space in which an operator is seated. A door 32 is provided on the side surface of cab 30. Door 32 is provided on the left side surface of cab 30. Door 32 is opened and closed when the operator gets into and out of cab 30. Operator's seat 41 is provided in the interior space defined inside cab 30. In cab 30, the operator sits in operator's seat 41 and operates wheel loader 10.

Note that the present disclosure can also be applicable to a type of a cab of a work vehicle that is equipped with an operator's seat in the external space.

Figure 2:
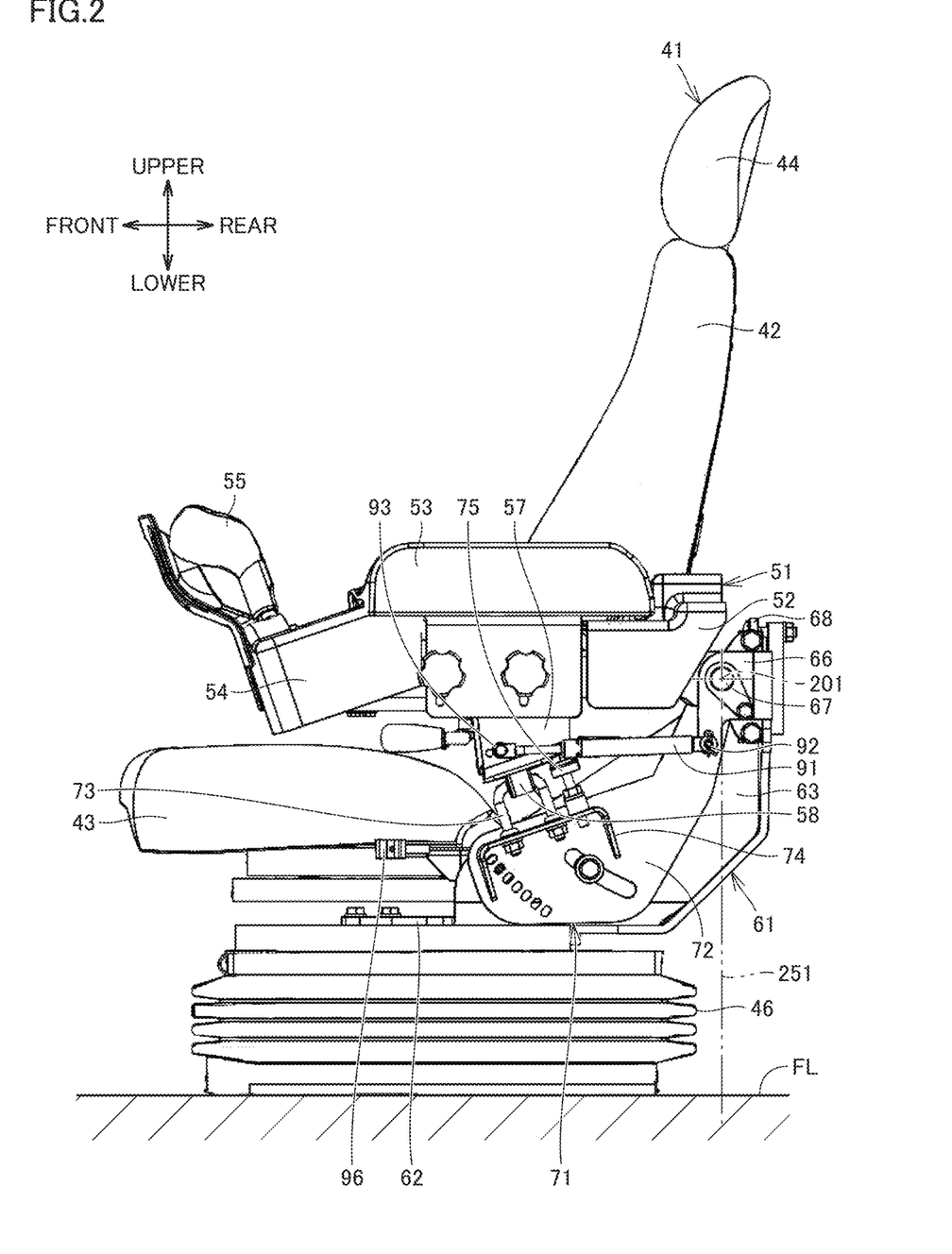
FIG. 2 is a side view showing a structure around an operator's seat inside a cab in FIG. 1 (when a console is set in a normal posture).
Figure 3:
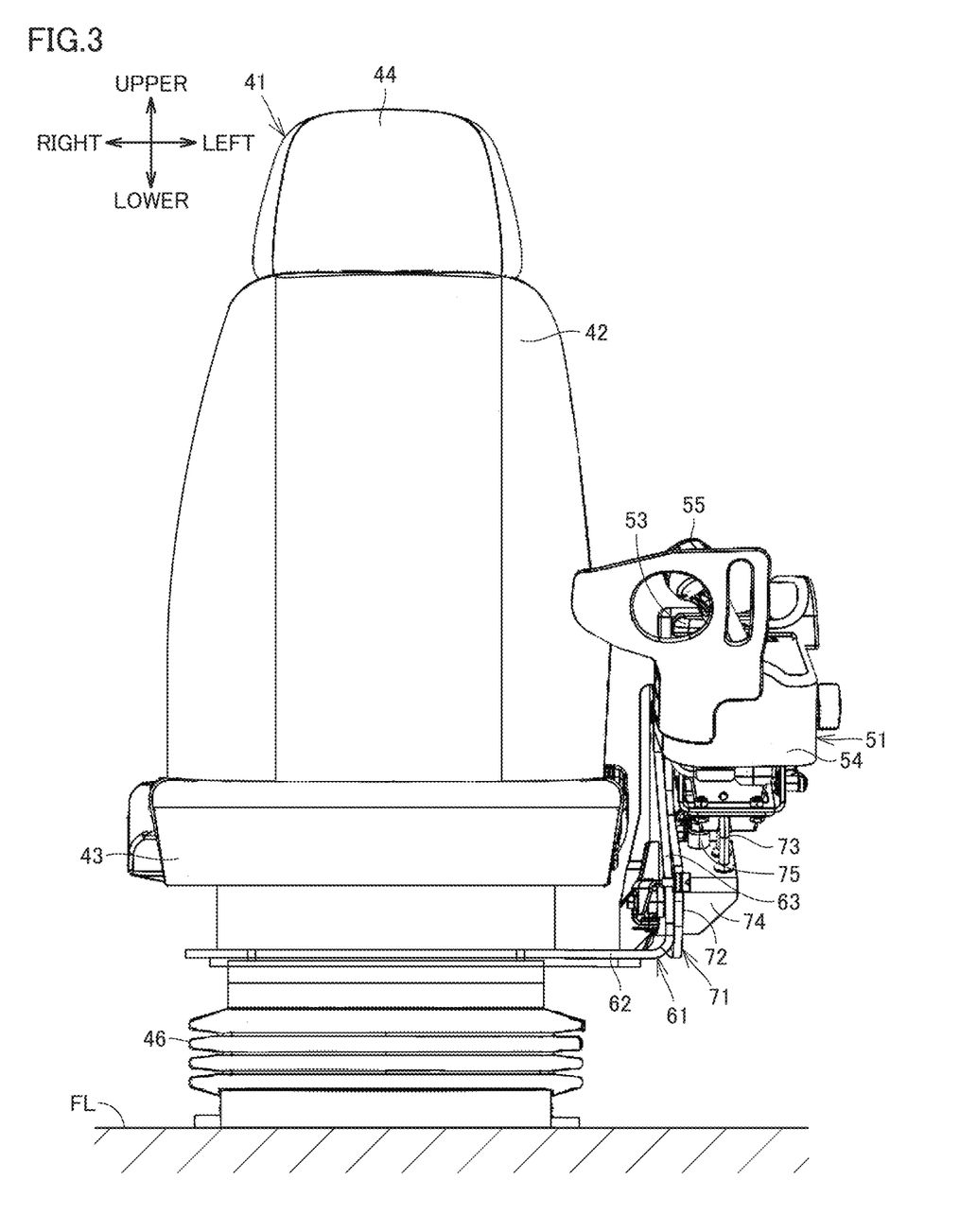
FIG. 3 is a front view showing the structure around the operator's seat inside the cab in FIG. 1 (when the console is set in a normal posture).

FIG. 2 is a side view showing a structure around an operator's seat inside the cab in FIG. 1 (when a console is set in a normal posture). FIG. 3 is a front view showing the structure around the operator's seat inside the cab in FIG. 1 (when the console is set in a normal posture).

As shown in FIGS. 2 and 3, operator's seat 41 includes a seat cushion 43, a seat back 42, a headrest 44, and a suspension mechanism unit 46.

Seat cushion 43 is provided to lie horizontally. Seat cushion 43 serves as a seat portion on which the operator sits. Seat back 42 is provided to rise up from the rear end portion of seat cushion 43. Seat back 42 is a seat portion serving as a backrest of the operator. Headrest 44 is attached to an upper end portion of seat back 42. Headrest 44 is a seat portion for supporting the operator's head.

Suspension mechanism unit 46 is provided between a floor surface FL of cab 30 and seat cushion 43 in the upward-downward direction. Suspension mechanism unit 46 elastically supports seat cushion 43.

Cab 30 further includes a console 51. Console 51 is provided on the lateral side of operator's seat 41. Console 51 is provided on the left side of operator's seat 41. Console 51 is provided between operator's seat 41 and door 32 (see FIG. 1) in the rightward-leftward direction. Console 51 is provided above seat cushion 43. Console 51 has an elongated shape in which the front-rear direction corresponds to the long-side direction and the rightward-leftward direction corresponds to the short-side direction.

Console 51 includes a main frame 52, an armrest 53, an operation lever support portion 54, an operation lever 55, a lower frame 57, and a catcher 58.

Main frame 52 is formed of a metal frame body extending in the front-rear direction. Armrest 53 is supported by main frame 52. Armrest 53 is provided above main frame 52. Armrest 53 includes a cushion material made of urethane foam or the like, and is used by the operator to rest his/her arm.

Operation lever support portion 54 is connected to a front end portion of main frame 52. Operation lever support portion 54 has a substantially rectangular parallelepiped outer shape. Operation lever support portion 54 is provided in a forward tilted posture such that the height of operation lever support portion 54 with respect to floor surface FL of cab 30 decreases toward the front end from main frame 52.

Operation lever 55 serves as an operation unit operated by the operator to operate wheel loader 10. Operation lever 55 has a lever shape that is manipulated to tilt. Operation lever 55 is operated to cause front frame 12 and rear frame 14 to pivot. Operation lever 55 is supported by operation lever support portion 54. Operation lever 55 protrudes upward from the top surface of operation lever support portion 54. Operation lever 55 is provided forward of armrest 53. Operation lever 55 may be an operation unit manipulated to operate work implement 16.

Lower frame 57 is formed of a frame body integrated with main frame 52. Lower frame 57 is provided at the bottom of main frame 52. Lower frame 57 protrudes downward from main frame 52. Lower frame 57 is provided below armrest 53.

Catcher 58 is attached to lower frame 57. Catcher 58 is provided at a lower end portion of lower frame 57. Catcher 58 is provided below armrest 53. Catcher 58 is provided rearward of operation lever 55 and operation lever support portion 54. Catcher 58 has a claw portion (not shown) that can engage with a striker 73, which will be described later.

Note that the console in the present disclosure may not be provided with an operation unit such as an operation lever. The console in the present disclosure may not be provided with an armrest.

Figure 4:
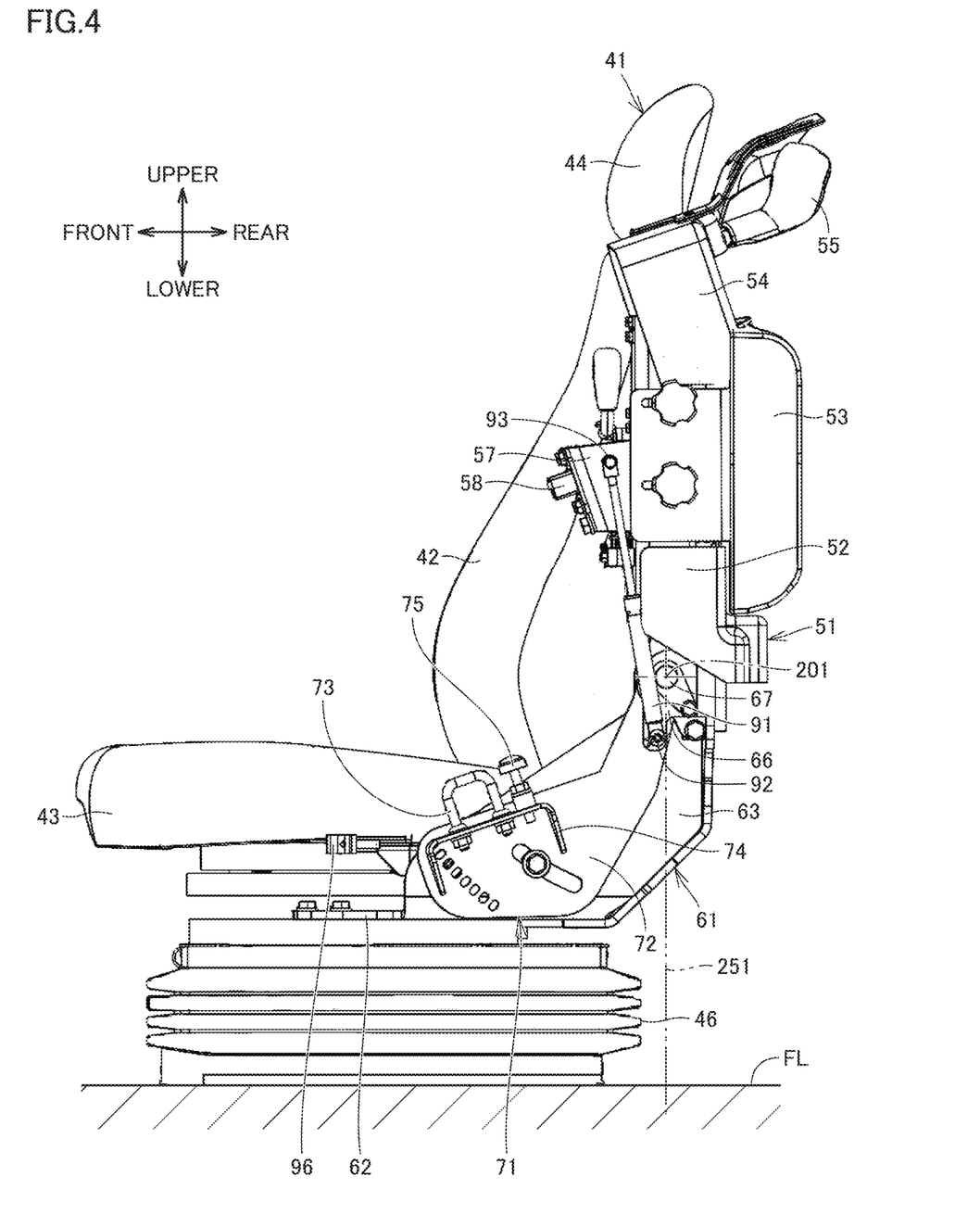
FIG. 4 is a side view showing the structure around the operator's seat inside the cab in FIG. 1 (when the console is set in a tipped-up posture).
Figure 5:
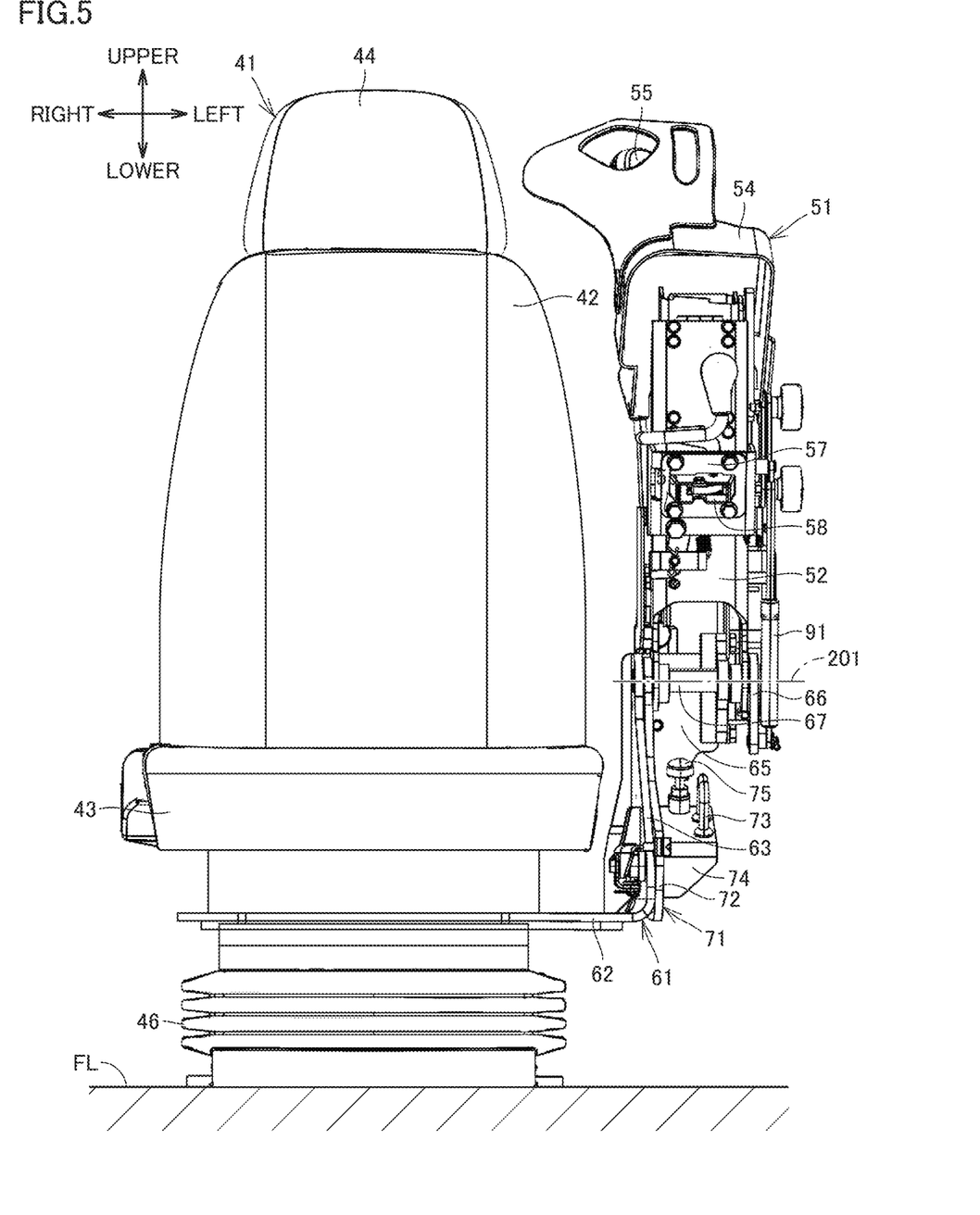
FIG. 5 is a front view showing the structure around the operator's seat inside the cab in FIG. 1 (when the console is set in a tipped-up posture).

FIG. 4 is a side view showing the structure around the operator's seat inside the cab in FIG. 1 (when the console is set in a tipped-up posture). FIG. 5 is a front view showing the structure around the operator's seat inside the cab in FIG. 1 (when the console is set in a tipped-up posture).

As shown in FIGS. 2 to 5, cab 30 further includes a base member 61. Base member 61 is provided as a mount base for supporting console 51. Base member 61 is connected to suspension mechanism unit 46.

Base member 61 includes a horizontal plate portion 62, a vertical plate portion 63, a rear plate portion 65 (see FIG. 5), a facing portion 66, and a support portion 67.

Lateral plate portion 62 has a plate shape parallel to the horizontal direction. Lateral plate portion 62 is fastened to the upper end portion of suspension mechanism unit 46. Lateral plate portion 62 protrudes leftward from the upper end portion of suspension mechanism unit 46. Vertical plate portion 63 has a plate shape intersecting in the rightward-leftward direction. Vertical plate portion 63 extends upward from the left end portion of horizontal plate portion 62. Vertical plate portion 63 extends in the front-rear direction on the lateral side of operator's seat 41.

Rear plate portion 65 has a plate shape intersecting in the front-rear direction. Rear plate portion 65 extends from the rear end portion of vertical plate portion 63 to be away from operator's seat 41 in the rightward-leftward direction. Rear plate portion 65 extends leftward from the rear end portion of vertical plate portion 63. Facing portion 66 has a plate shape intersecting in the rightward-leftward direction. Facing portion 66 extends forward from the left end portion of rear plate portion 65. Facing portion 66 faces vertical plate portion 63 at a distance therefrom in the rightward-leftward direction.

As shown in FIG. 5, support portion 67 has a shaft shape extending in the rightward-leftward direction. Support portion 67 has a cylindrical shape. One end (the right end portion) of support portion 67 in its axial direction is connected to vertical plate portion 63 while the other end (the left end portion) of support portion 67 in its axial direction is connected to facing portion 66. Support portion 67 passes between vertical plate portion 63 and facing portion 66.

As shown in FIGS. 2 to 5, support portion 67 is provided at a position close to the rear end portion of base member 61 in the front-rear direction. Support portion 67 is provided rearward of seat cushion 43. Support portion 67 is provided above seat cushion 43. Support portion 67 is provided above lateral plate portion 62.

Base member 61 pivotably supports console 51 by support portion 67. Support portion 67 is inserted into main frame 52 (see FIG. 5) to thereby pivotably support console 51. Console 51 is pivotable about a pivot central axis 201. Support portion 67 extends along the axis of pivot central axis 201.

Console 51 is pivotable between a normal posture (the posture of console 51 shown in FIGS. 2 and 3) and a tipped-up posture (the posture of console 51 shown in FIGS. 4 and 5).

As shown in FIGS. 2 and 3, in the normal posture, console 51 is disposed to extend forward from support portion 67. Console 51 is disposed on the lateral side of the operator seated on operator's seat 41. Operation lever 55 and armrest 53 are arranged in the front-rear direction. Armrest 53 is located between operation lever 55 and support portion 67 in the front-rear direction.

When the operator seated on operator's seat 41 operates wheel loader 10, console 51 is set in a normal posture. When the operator seated on operator's seat 41 uses armrest 53 to rest his/her arm, console 51 is set in a normal posture. When the operator seated on operator's seat 41 operates operation lever 55, console 51 is set in a normal posture.

As shown in FIGS. 4 and 5, in the tipped-up posture, console 51 is disposed to extend upward from support portion 67. Console 51 is provided on the lateral side of seat back 42 so as to rise up from support portion 67. Armrest 53 is located rearward of seat cushion 43. Operation lever 55 and armrest 53 are arranged in the upward-downward direction. Armrest 53 is located between operation lever 55 and support portion 67 in the upward-downward direction.

When the operator gets in and out of operator's seat 41, console 51 is set in a tipped-up posture. Thus, the operator can smoothly perform an action of getting in and out of operator's seat 41 without being blocked by console 51.

As shown in FIGS. 2 and 4, a vertical line 251 is assumed to extend between pivot central axis 201 of console 51 and floor surface FL of cab 30. As a result of measuring the angle from vertical line 251 in the clockwise direction about pivot central axis 201, the angle formed about pivot central axis 201 between vertical line 251 and console 51 set in the tipped-up posture is larger than the angle formed about pivot central axis 201 between vertical line 251 and console 51 set in the normal posture.

Figure 6:
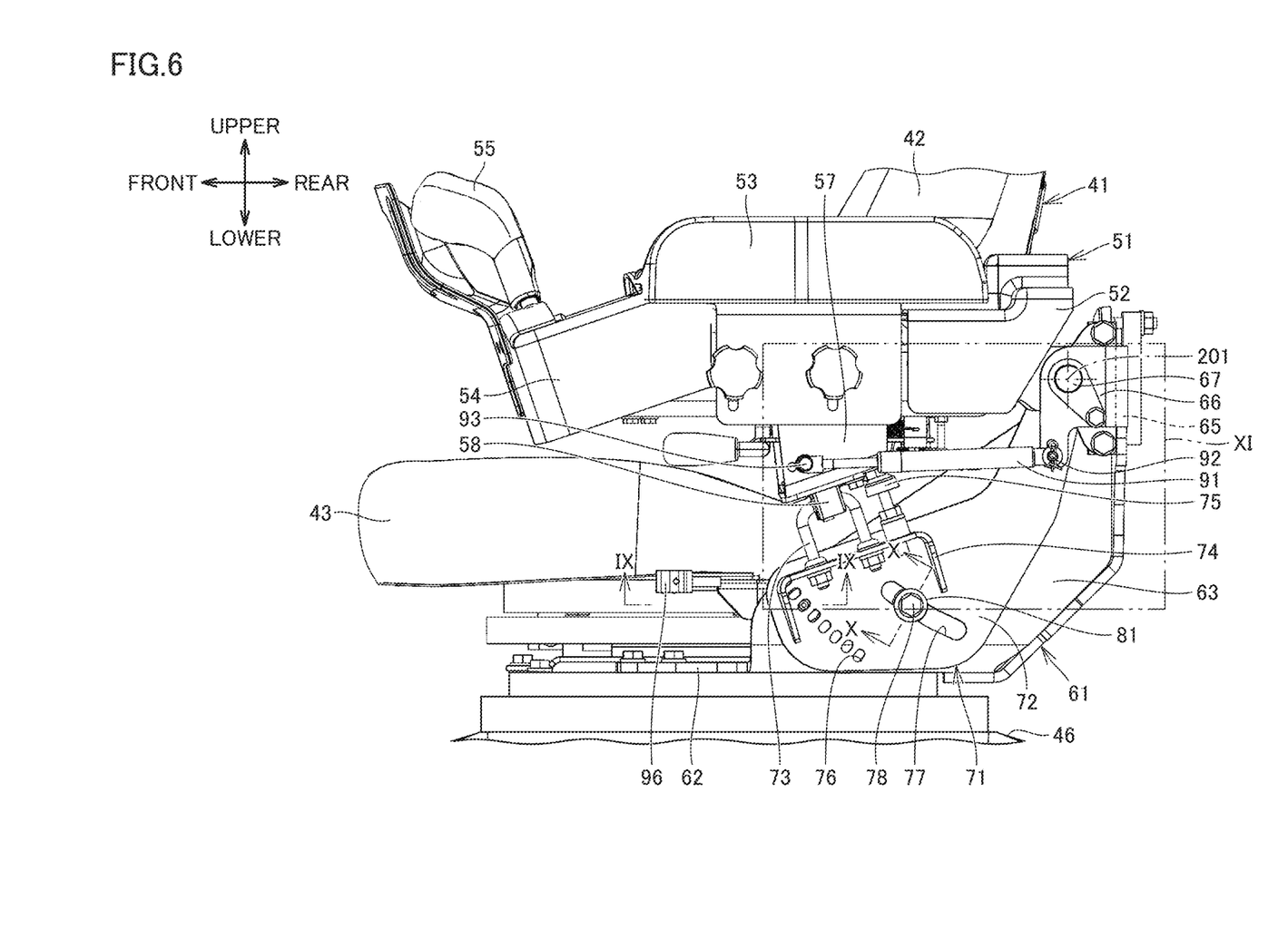
FIG. 6 is a side view showing the console adjusted at a normal angle by a tilt mechanism.
Figure 7:
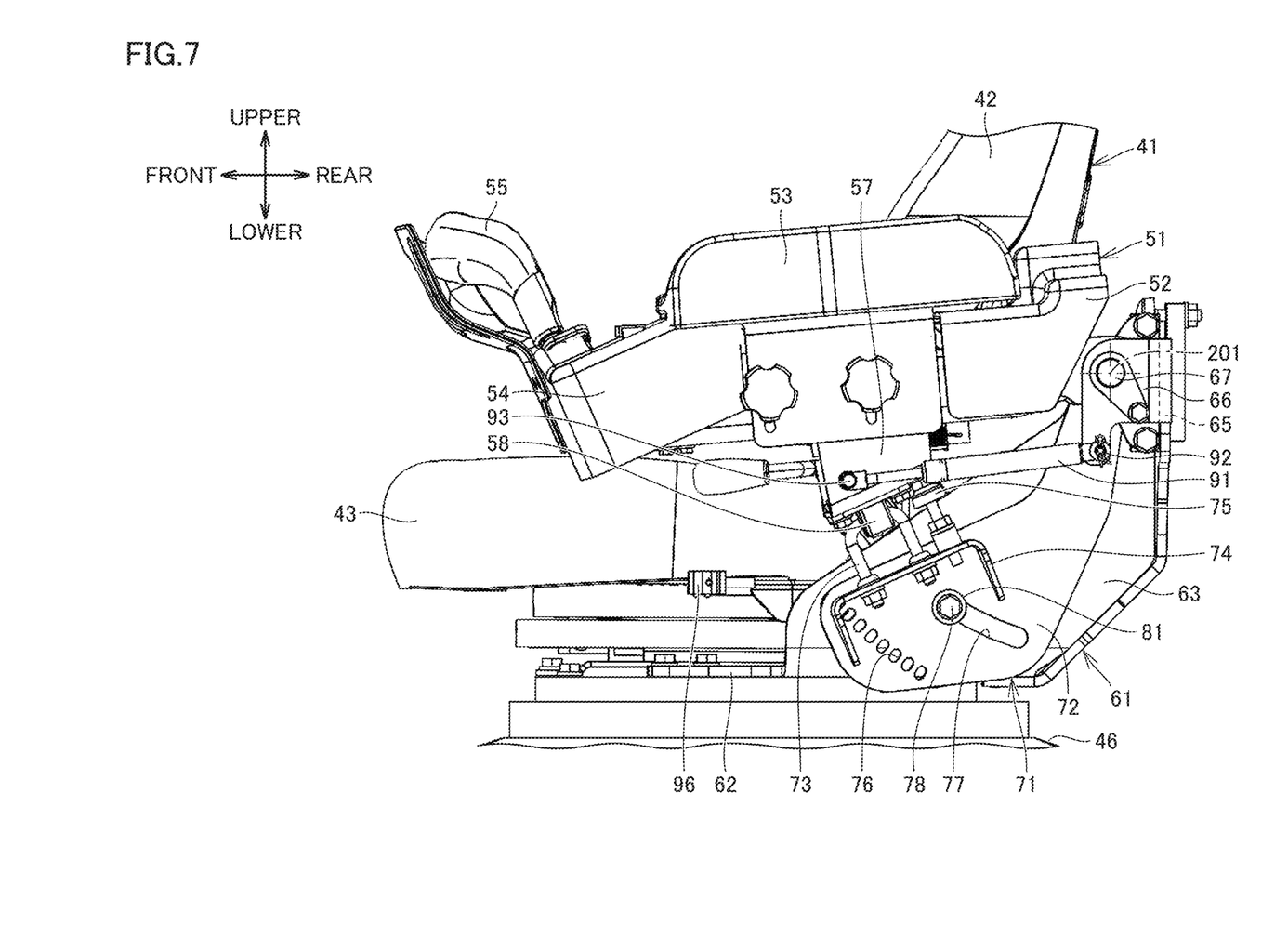
FIG. 7 is a side view showing the console adjusted at a forward tilt angle by the tilt mechanism.
Figure 8:
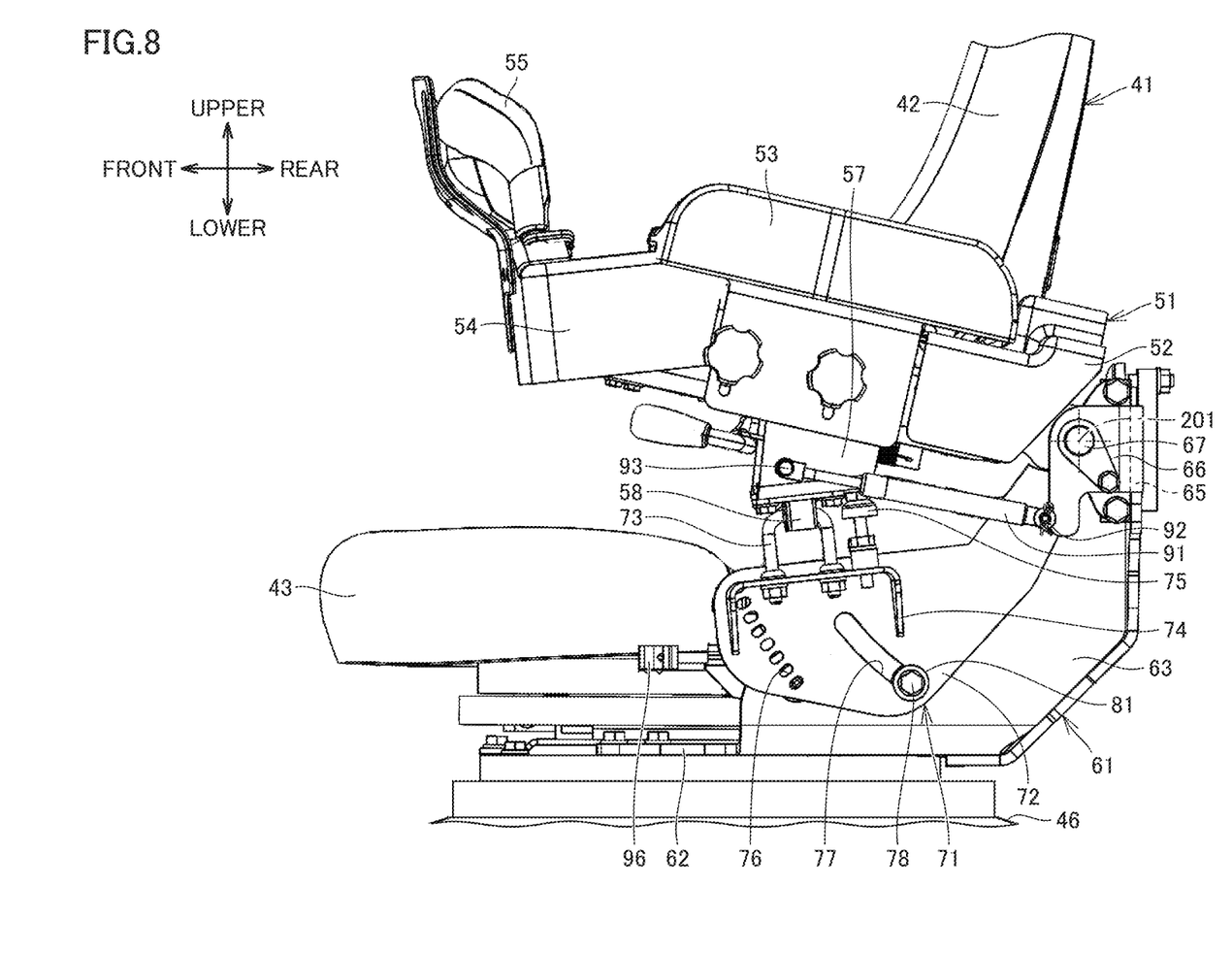
FIG. 8 is a side view showing the console adjusted at a backward tilt angle by the tilt mechanism.

FIG. 6 is a side view showing the console adjusted at a normal angle by a tilt mechanism. FIG. 7 is a side view showing the console adjusted at a forward tilt angle by the tilt mechanism. FIG. 8 is a side view showing the console adjusted at a backward tilt angle by the tilt mechanism.

As shown in FIGS. 6 to 8, cab 30 further includes a tilt mechanism 71. Tilt mechanism 71 is configured to be capable of adjusting the angle of console 51 set in a normal posture.

Tilt mechanism 71 includes a movable portion 72. Movable portion 72 has a plate shape parallel to vertical plate portion 63. Movable portion 72 overlaps with vertical plate portion 63 from the lateral side. Vertical plate portion 63 is located between operator's seat 41 and movable portion 72 in the rightward-leftward direction. Movable portion 72 is located between vertical plate portion 63 and facing portion 66 in the rightward-leftward direction. Movable portion 72 is provided below console 51 set in the normal posture.

Movable portion 72 is configured to be pivotable. Movable portion 72 is pivotably supported by support portion 67. Support portion 67 is inserted into movable portion 72 (see FIG. 5) to thereby pivotably support movable portion 72. Movable portion 72 is pivotable about pivot central axis 201.

Tilt mechanism 71 further includes a mount 74, a striker 73, and a first stopper 75. Mount 74 protrudes laterally (leftward) from movable portion 72. Mount 74 is provided on the opposite side of vertical plate portion 63 across movable portion 72 in the rightward-leftward direction. Mount 74 faces lower frame 57 of console 51 set in the normal posture at a distance therefrom in the upward-downward direction.

Striker 73 is provided integrally with movable portion 72. Striker 73 is attached to mount 74. Striker 73 is provided at a position away from pivot central axis 201 in its radial direction. Striker 73 and catcher 58 are provided on arcs having the same radius about pivot central axis 201. Striker 73 has a bar shape protruding upward from mount 74.

Striker 73 is engaged with console 51 set in a normal posture. Striker 73 is engaged with catcher 58 of console 51 set in the normal posture. The engagement between catcher 58 and striker 73 allows console 51 to be held in the normal posture.

First stopper 75 is provided integrally with movable portion 72. First stopper 75 is attached to mount 74. First stopper 75 is located inward of striker 73 in the radial direction of pivot central axis 201. First stopper 75 comes into contact with console 51 (lower frame 57) set in the normal posture. Thereby, first stopper 75 defines the pivotal end of console 51 on the normal posture side.

Note that a second stopper 68 that defines the pivotal end of console 51 on the tipped-up posture side is attached to base member 61 (see FIG. 2). Console 51 is pivotable between a position at which console 51 comes into contact with first stopper 75 and a position at which console 51 comes into contact with second stopper 68. The angle range in which console 51 pivots is larger than the angle range in which movable portion 72 pivots.

Figure 9:
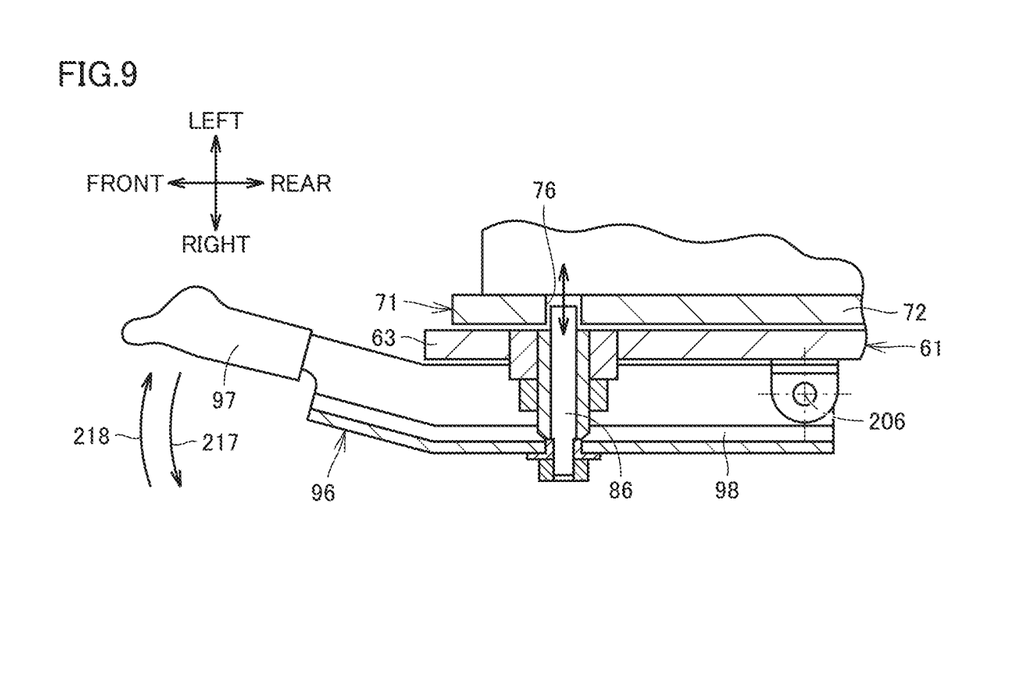
FIG. 9 is a cross-sectional view showing a base member and a tilt mechanism as viewed in a direction indicated by an arrow along a line IX-IX in FIG. 6.

FIG. 9 is a cross-sectional view showing the base member and the tilt mechanism as viewed in a direction indicated by an arrow along a line IX-IX in FIG. 6.

As shown in FIGS. 6 and 9, movable portion 72 is provided with a plurality of pin insertion holes 76. Each pin insertion hole 76 passes through movable portion 72 in the rightward-leftward direction. Each pin insertion hole 76 passes through movable portion 72 in the axial direction of pivot central axis 201. The plurality of pin insertion holes 76 are spaced apart from each other. The plurality of pin insertion holes 76 are spaced apart from each other in the circumferential direction of pivot central axis 201.

Cab 30 further includes a positioning lever 96. Positioning lever 96 is attached to base member 61. Positioning lever 96 is operated by an operator in order to position movable portion 72 at a plurality of indexed positions displaced in the circumferential direction of pivot central axis 201.

Positioning lever 96 includes a grip portion 97, an arm portion 98, and a pin 86. Arm portion 98 is provided between vertical plate portion 63 and operator's seat 41 in the rightward-leftward direction. Arm portion 98 is pivotably supported by vertical plate portion 63. Arm portion 98 is pivotably supported about pivot central axis 206. Pivot central axis 206 extends in the upward-downward direction. Arm portion 98 extends forward from pivot central axis 206 to form an arm shape.

Grip portion 97 is provided at a front end portion of arm portion 98. Grip portion 97 is provided below seat cushion 43. Grip portion 97 is exposed from vertical plate portion 63 in a side view shown in FIG. 6. Grip portion 97 has a shape that can be gripped by the operator.

Pin 86 is attached to arm portion 98. Pin 86 is inserted from arm portion 98 into vertical plate portion 63 to be movable back and forth, and further extends toward movable portion 72. Pin 86 is provided to be insertable into and removable from pin insertion hole 76. Pin 86 is selectively inserted into one of the plurality of pin insertion holes 76 to thereby fix movable portion 72. When pin 86 is selectively inserted into one of the plurality of pin insertion holes 76, movable portion 72 is kept at the position in the circumferential direction of pivot central axis 201.

During the angle adjustment of console 51, the operator holds grip portion 97 to operate positioning lever 96 to pivot in a direction away from movable portion 72 (in the direction indicated by an arrow 217 in FIG. 9), and then, pin 86 is removed from pin insertion hole 76. The operator operates movable portion 72 to pivot about pivot central axis 201 to thereby move striker 73 provided integrally with movable portion 72 in the circumferential direction of pivot central axis 201.

Then, when the operator holds grip portion 97 and moves positioning lever 96 to pivot in the direction approaching movable portion 72 (in the direction indicated by an arrow 218 in FIG. 9), pin 86 is inserted into pin insertion hole 76. Thereby, movable portion 72 is positioned at the indexed position corresponding to the position of pin insertion hole 76 into which pin 86 is inserted. The operation as described above changes the position at which catcher 58 and striker 73 engage with each other, to thereby allow adjustment of the angle of console 51 set in the normal posture.

Representatively, FIG. 6 shows the case where console 51 is adjusted at a normal angle at which the height of the top surface of armrest 53 with respect to floor surface FL of cab 30 is constant in the front-rear direction. FIG. 7 shows the case where console 51 is adjusted at a forward tilt angle at which the height of the top surface of armrest 53 with respect to floor surface FL of cab 30 decreases toward the front end. FIG. 8 shows the case where console 51 is adjusted at a backward tilt angle at which the height of the top surface of armrest 53 with respect to floor surface FL of cab 30 decreases toward the rear end.

As shown in FIGS. 4 and 5, catcher 58 and striker 73 are disengaged from each other, and console 51 is set in a tipped-up posture. Striker 73 is separated from console 51 set in the tipped-up posture. Striker 73 is separated from catcher 58 of console 51 set in the tipped-up posture.

According to the configuration as described above, when console 51 is set in the tipped-up posture, striker 73 is separated from catcher 58 of console 51. Thus, the change in the position of striker 73 caused by the angle adjustment of console 51 set in the normal posture does not influence the inclination of console 51 set in the tipped-up posture. Irrespective of the adjusted angle of console 51 set in the normal posture, the inclination of console 51 set in the tipped-up posture can be kept constant.

As shown in FIGS. 2 and 3, when console 51 is set in the normal posture, striker 73 engages with catcher 58 of console 51. In such a configuration, console 51 can be firmly fixed by tilt mechanism 71. As a result, even when excessive vibration occurs during the operation of wheel loader 10, positional deviation of console 51 can be more reliably prevented.

Further, support portion 67 for pivotably supporting console 51 is shared as a member for pivotably supporting movable portion 72. Such a configuration allows a simple configuration of the support mechanism of movable portion 72 in tilt mechanism 71.

As shown in FIGS. 6 to 8, cab 30 further includes a gas spring 91. Gas spring 91 is connected to base member 61 and console 51. Gas spring 91 biases console 51 to change its posture from the normal posture to the tipped-up posture.

Gas spring 91 has a cylinder-side end portion 92 and a rod-side end portion 93. Cylinder-side end portion 92 is connected to base member 61. Cylinder-side end portion 92 is pivotably connected to facing portion 66. Cylinder-side end portion 92 is located below support portion 67 (pivot central axis 201). Rod-side end portion 93 is connected to console 51. Rod-side end portion 93 is pivotably connected to lower frame 57.

As shown in FIG. 2, when console 51 is set in the normal posture, gas spring 91 extends in the front-rear direction between cylinder-side end portion 92 and rod-side end portion 93. As shown in FIG. 4, when console 51 is set in the tipped-up posture, gas spring 91 extends in the upward-downward direction between cylinder-side end portion 92 and rod-side end portion 93.

As shown in FIGS. 2 and 4, the length of gas spring 91 between cylinder-side end portion 92 and rod-side end portion 93 is shorter when console 51 is set in the normal posture than when console 51 is set in the tipped-up posture.

When console 51 is pivoted from the normal posture to the tipped-up posture, rod-side end portion 93 moves in the circumferential direction of pivot central axis 201 together with lower frame 57. At this time, the reaction force of the compressed gas sealed inside gas spring 91 causes gas spring 91 to extend to increase its length between cylinder-side end portion 92 and rod-side end portion 93. Thereby, biasing force acts from gas spring 91 onto console 51 so as to change the posture of console 51 from the normal posture to the tipped-up posture.

According to the configuration as described above, the operator can readily operate console 51 to change its posture from the normal posture to the tipped-up posture with the assistance of the biasing force of gas spring 91.

Further, cylinder-side end portion 92 and rod-side end portion 93 of gas spring 91 are connected to facing portion 66 of base member 61 and lower frame 57 of console 51, respectively. Thus, even when striker 73 and catcher 58 engage with each other, the biasing force from gas spring 91 does not directly act on tilt mechanism 71. Thus, when the angle of console 51 set in the normal posture is adjusted, the operator can operate movable portion 72 of tilt mechanism 71 to pivot without being significantly influenced by the biasing force from gas spring 91. This allows easy operation of tilt mechanism 71.

Figure 10:
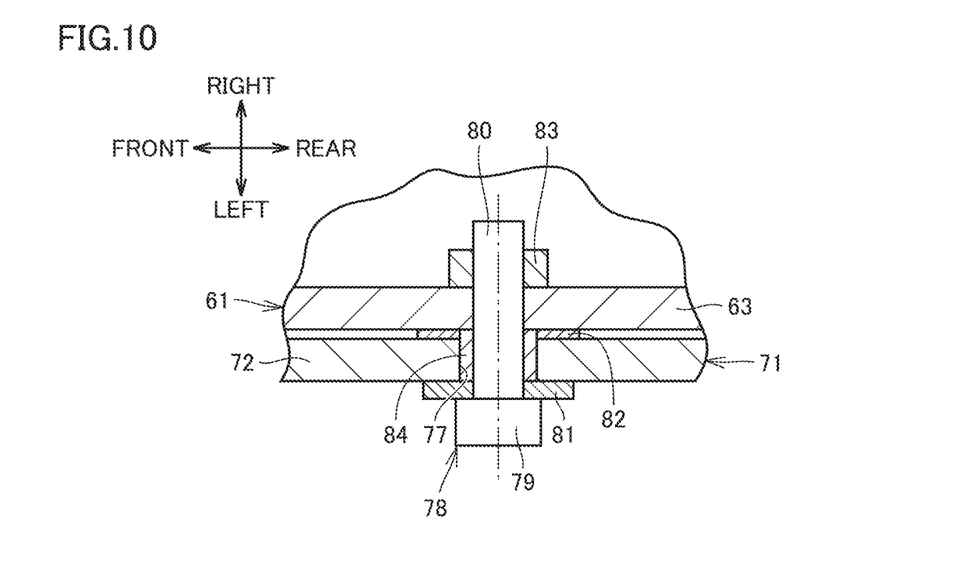
FIG. 10 is a cross-sectional view showing the base member and the tilt mechanism as viewed in a direction indicated by an arrow along a line X-X in FIG. 6.

FIG. 10 is a cross-sectional view showing the base member and the tilt mechanism as viewed in a direction indicated by an arrow along a line X-X in FIG. 6.

As shown in FIGS. 6 and 10, movable portion 72 is provided with a through hole 77. Through hole 77 passes through movable portion 72 in the rightward-leftward direction. Through hole 77 passes through movable portion 72 in the axial direction of pivot central axis 201. Through hole 77 extends in an elongated hole shape in the circumferential direction of pivot central axis 201. The length of through hole 77 in the circumferential direction of pivot central axis 201 is greater than the width of through hole 77 in the radial direction of pivot central axis 201.

Through hole 77 is located inward of the plurality of pin insertion holes 76 in the radial direction of pivot central axis 201.

Tilt mechanism 71 further includes a bolt 78, a nut 83, a first washer 81, a second washer 82, and a collar 84.

Bolt 78 is inserted into through hole 77. Bolt 78 is connected to base member 61 with nut 83.

Bolt 78 has a head portion 79 and a shaft portion 80. Shaft portion 80 has a shaft shape extending in the rightward-leftward direction. Shaft portion 80 has a shaft shape extending in the axial direction of pivot central axis 201. Shaft portion 80 has an outer circumferential surface provided with a male screw. Shaft portion 80 has a diameter smaller than the width of through hole 77 in the radial direction of pivot central axis 201. Head portion 79 is provided at an end portion of shaft portion 80. Head portion 79 is larger in diameter than shaft portion 80.

Shaft portion 80 is inserted into through hole 77 from the opposite side of vertical plate portion 63 across movable portion 72, and further inserted into vertical plate portion 63. Nut 83 is screwed into a portion of shaft portion 80 that protrudes from vertical plate portion 63.

First washer 81 and second washer 82 each have an annular flat plate shape. First washer 81 and second washer 82 are fitted to shaft portion 80. First washer 81 and second washer 82 are disposed on both sides of movable portion 72 in the axial direction of shaft portion 80. First washer 81 and second washer 82 are provided so as to sandwich movable portion 72 from both sides in the axial direction of shaft portion 80.

First washer 81 is interposed between head portion 79 and movable portion 72. Second washer 82 is interposed between movable portion 72 and vertical plate portion 63. Second washer 82 prevents contact between movable portion 72 and vertical plate portion 63. Collar 84 has a cylindrical shape. Collar 84 is fitted to shaft portion 80. Collar 84 is interposed between the outer circumferential surface of shaft portion 80 and the inner circumferential surface of through hole 77 in the radial direction of shaft portion 80. Collar 84 is interposed between first washer 81 and vertical plate portion 63 in the axial direction of shaft portion 80.

According to the configuration as described above, by shaft portion 80 inserted into through hole 77 having an elongated hole shape, and also by first washer 81 and second washer 82 disposed on both sides of movable portion 72 in the axial direction of shaft portion 80, movable portion 72 can be guided in the circumferential direction of pivot central axis 201 while movable portion 72 can be held in the axial direction of pivot central axis 201. This allows a simple configuration of the support mechanism of movable portion 72 in tilt mechanism 71.

In the above description of the present embodiment, the shaft member in the present disclosure is shaft portion 80 of bolt 78, but is not limited thereto. The shaft member in the present disclosure may be a stud bolt, for example. In this case, nuts may be fastened to both ends of the stud bolt.

Figure 11:
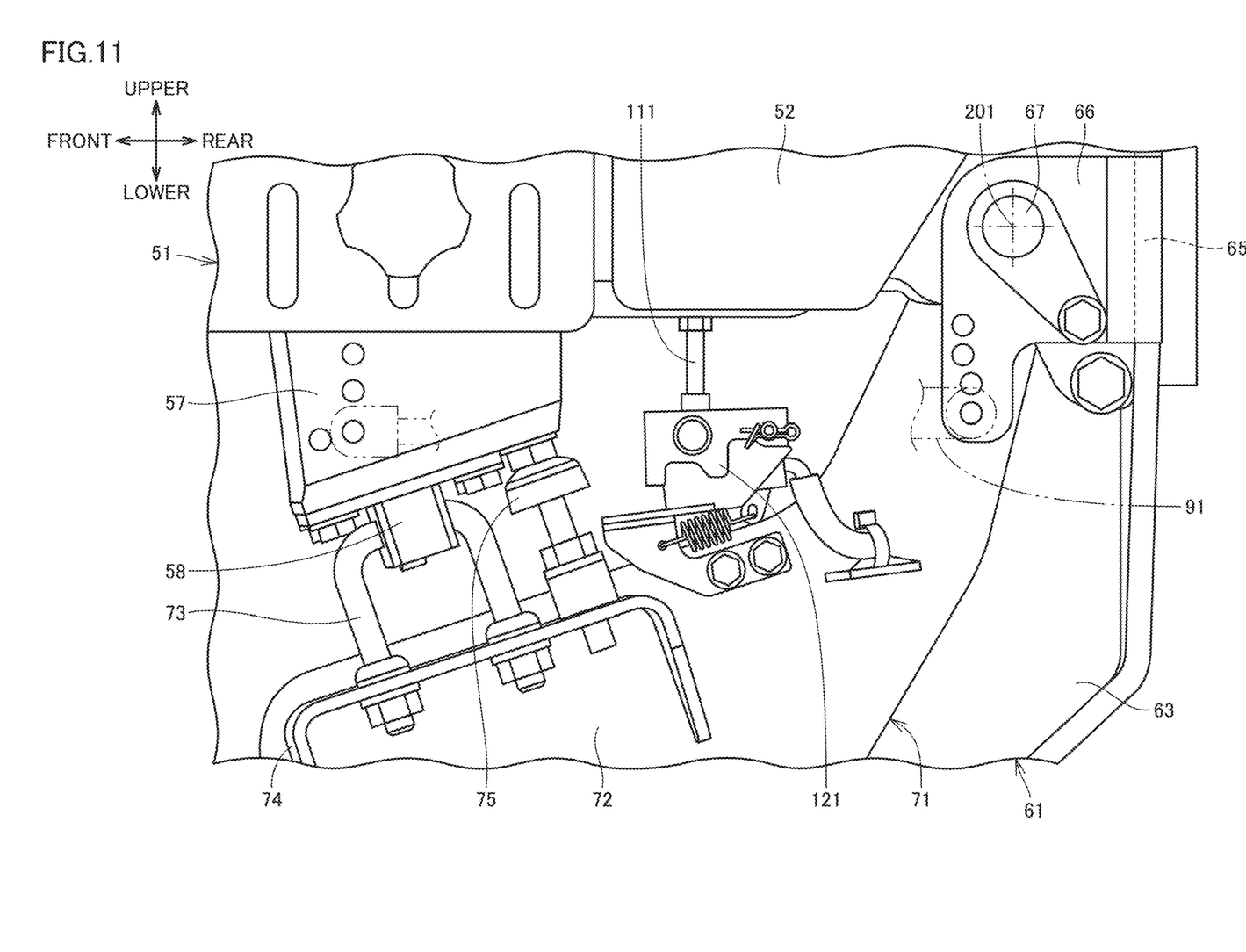
FIG. 11 is a side view showing a range surrounded by a chain double-dashed line XI in FIG. 6 in an enlarged manner.

FIG. 11 is a side view showing a range surrounded by a chain double-dashed line XI in FIG. 6 in an enlarged manner. FIG. 11 does not show gas spring 91 in FIG. 6.

As shown in FIG. 11, cab 30 further includes a sensor 121. Sensor 121 detects console 51 set in the normal posture. Sensor 121 is attached to tilt mechanism 71. Sensor 121 is attached to movable portion 72. Sensor 121 is located inward of striker 73 and first stopper 75 in the radial direction of pivot central axis 201.

Sensor 121 is a contact-type sensor that comes into contact with a detection target to thereby detect the detection target. Console 51 further includes a detector 111. Detector 111 protrudes downward from main frame 52. Sensor 121 comes into contact with detector 111 to thereby detect console 51 set in the normal posture.

According to the configuration as described above, sensor 121 is attached to movable portion 72 provided integrally with striker 73. Thus, irrespective of the indexed position of movable portion 72, the positional relation between sensor 121 and striker 73 is kept constant. Thereby, sensor 121 can reliably detect console 51 set in the normal posture irrespective of the angle adjustment of console 51.

Note that the type of sensor in the present disclosure is not limited to the above-mentioned contact-type sensor but may be a non-contact type sensor that detects a detection target without coming into contact with the detection target.

The following summarizes the configurations and effects about cab 30 and wheel loader 10 in the present embodiment as described above.

A cab 30 includes a console 51, a base member 61, and a tilt mechanism 71. Console 51 is provided on the lateral side of an operator's seat 41. Base member 61 includes a support portion 67. Base member 61 pivotably supports console 51 by support portion 67 between a normal posture as the first posture and a tipped-up posture as the second posture. In the normal posture, console 51 is disposed to extend forward from support portion 67. In the tipped-up posture, console 51 is disposed to extend upward from support portion 67. Tilt mechanism 71 includes a striker 73 as an engagement portion. Striker 73 is engaged with console 51 set in the normal posture and disengaged from console 51 set in the tipped-up posture. Tilt mechanism 71 is capable of adjusting the angle of console 51 set in the normal posture.

According to the configuration as described above, striker 73 is separated from console 51 set in the tipped-up posture, and thereby, the angle adjustment of console 51 in tilt mechanism 71 can be prevented from influencing the inclination of console 51 set in the tipped-up posture. Thereby, the inclination of console 51 set in the tipped-up posture can be kept constant. Further, since striker 73 is engaged with console 51 set in the normal posture, console 51 can be firmly fixed by tilt mechanism 71. Consequently, positional deviation of console 51 set in the normal posture is less likely to occur.

In addition, tilt mechanism 71 further includes a movable portion 72 that is pivotable. Movable portion 72 is provided integrally with striker 73.

According to the configuration as described above, when movable portion 72 pivots, striker 73 integrally provided in movable portion 72 also moves in the circumferential direction of pivot central axis 201 of movable portion 72. This changes the position at which console 51 engages with striker 73, and therefore, the angle of console 51 set in the normal posture can be adjusted.

Further, movable portion 72 is pivotably supported by support portion 67.

According to such a configuration, movable portion 72 is pivotably supported by support portion 67 shared with console 51, to thereby allow a simple configuration of the support mechanism of movable portion 72 in tilt mechanism 71.

Further, movable portion 72 is provided with a through hole 77. Through hole 77 passes through movable portion 72 in an axial direction of a pivot central axis 201 of movable portion 72. Through hole 77 extends in an elongated hole shape in a circumferential direction of pivot central axis 201 of movable portion 72. Tilt mechanism 71 further includes a shaft portion 80 of a bolt 78 as a shaft member, and a first washer 81 and a second washer 82. Shaft portion 80 is inserted into through hole 77. Shaft portion 80 is connected to base member 61. First washer 81 and second washer 82 are fitted to shaft portion 80. First washer 81 and second washer 82 are disposed on both sides of movable portion 72 in the axial direction of shaft portion 80.

According to the configuration as described above, in a simple configuration, movable portion 72 can be guided in the circumferential direction of pivot central axis 201 while it can be held in the axial direction of pivot central axis 201.

Further, movable portion 72 is provided with a plurality of pin insertion holes 76. The plurality of pin insertion holes 76 are spaced apart from each other in the circumferential direction of pivot central axis 201. Tilt mechanism 71 further includes a pin 86. Pin 86 is selectively inserted into one of the plurality of pin insertion holes 76 to thereby fix movable portion 72.

According to the configuration as described above, in a simple operation of inserting and removing pin 86 into and from pin insertion hole 76, the operator can lock and unlock movable portion 72. Therefore, the operability of tilt mechanism 71 during the angle adjustment of console 51 can be improved.

Moreover, cab 30 further includes a gas spring 91 as a biasing member. Gas spring 91 is connected to base member 61 and console 51. Gas spring 91 biases console 51 to change the posture of console 51 from a normal posture to a tipped-up posture.

According to the configuration as described above, the biasing force of gas spring 91 can assist the operation to change the posture of console 51 from the normal posture to the tipped-up posture. Further, even when striker 73 is engaged with console 51 set in the normal posture, the biasing force of gas spring 91 does not directly act on tilt mechanism 71, so that tilt mechanism 71 can readily adjust the angle of console 51.

Cab 30 further includes a sensor 121. Sensor 121 is attached to tilt mechanism 71. Sensor 121 detects console 51 set in the normal posture.

According to the configuration as described above, since sensor 121 is attached to tilt mechanism 71, the position of sensor 121 also changes with respect to console 51 in accordance with the angle adjustment of console 51 by tilt mechanism 71. Thus, sensor 121 can reliably detect console 51 set in the normal posture irrespective of the angle adjustment of console 51.

A wheel loader 10 as a work vehicle includes cab 30. According to the configuration as described above, wheel loader 10 includes cab 30 that allows a console set in a tipped-up posture to be tilted at a constant inclination and that is less likely to cause positional deviation of console 51 set in a normal posture, and therefore, the usability of cab 30 for the operator can be improved.

Note that the present disclosure is not limited to a cab of a wheel loader, but may be applicable to cabs of various work vehicles each including a console.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 wheel loader, 12 front frame, 14 rear frame, 16 work implement, 17 engine hood, 21 boom, 22 bell crank, 23 link, 24 bucket, 25 boom cylinder, 26 bucket cylinder, 27 front wheel, 28 rear wheel, 30 cab, 32 door, 41 operator's seat, 42 seat back, 43 seat cushion, 44 headrest, 46 suspension mechanism unit, 51 console, 53 armrest, 52 main frame, 54 operation lever support portion, 55 operation lever, 57 lower frame, 58 catcher, 61 base member, 62 horizontal plate portion, 63 vertical plate portion, 65 rear plate portion, 66 facing portion, 67 support portion, 68 second stopper, 71 tilt mechanism, 72 movable portion, 73 striker, 74 mount, 75 first stopper, 76 pin insertion hole, 77 through hole, 78 bolt, 79 head portion, 80 shaft portion, 81 first washer, 82 second washer, 83 nut, 84 collar, 91 gas spring, 92 cylinder-side end portion, 93 rod-side end portion, 96 positioning lever, 97 grip portion, 98 arm portion, 111 detector, 121 sensor, 201, 206 pivot central axis, 251 vertical line.

The invention claimed is:

1. A cab comprising:
   a console provided on a lateral side of an operator's seat;
   a base member including a support portion that pivotably supports the console between a first posture in which the console is disposed to extend forward from the support portion and a second posture in which the console is disposed to extend upward from the support portion; and
   a tilt mechanism including an engagement portion that is engaged with the console set in the first posture and disengaged from the console set in the second posture, the tilt mechanism being capable of adjusting an angle of the console set in the first posture,
   wherein the tilt mechanism includes a movable portion that is pivotable, the moveable portion is integrally provided with the engagement portion via a mount, and the movable portion is pivotably supported by the support portion.

2. The cab according to claim 1, wherein
   the movable portion is provided with a through hole passing through the movable portion in an axial direction of a pivot central axis of the movable portion, the through hole extending in an elongated hole shape in a circumferential direction of the pivot central axis of the movable portion, and
   the tilt mechanism further includes
   a shaft member inserted into the through hole and connected to the base member, and
   a first washer and a second washer that are fitted to the shaft member and disposed on both sides of the movable portion in an axial direction of the shaft member.

3. The cab according to claim 1, wherein
the movable portion is provided with a plurality of pin insertion holes spaced apart from each other in a circumferential direction of a pivot central axis of the movable portion, and
the tilt mechanism further includes a pin selectively inserted into one of the pin insertion holes to fix the movable portion.

4. The cab according to claim 1, further comprising a biasing member connected to the base member and the console to bias the console to change a posture of the console from the first posture to the second posture.

5. The cab according to claim 1, further comprising a sensor attached to the tilt mechanism to detect the console set in the first posture.

6. A work vehicle comprising the cab according to claim 1.

* * * * *